United States Patent
Riegel et al.

(10) Patent No.: US 7,714,061 B2
(45) Date of Patent: May 11, 2010

(54) POSTCROSSLINKING OF WATER ABSORBING POLYMERIC PARTICLES

(75) Inventors: Ulrich Riegel, Landstuhl (DE); Thomas Daniel, Waldsee (DE); Uwe Stueven, Bad Soden (DE); Mark Elliott, Ludwigshafen (DE)

(73) Assignee: BASF Aktiengesellschaft

( * ) Notice: Subject to any disclaimer, the term of this patent is extended or adjusted under 35 U.S.C. 154(b) by 446 days.

(21) Appl. No.: 11/667,873

(22) PCT Filed: Nov. 28, 2005

(86) PCT No.: PCT/EP2005/012678

§ 371 (c)(1),
(2), (4) Date: May 16, 2007

(87) PCT Pub. No.: WO2006/058682

PCT Pub. Date: Jun. 8, 2006

(65) Prior Publication Data

US 2007/0293632 A1    Dec. 20, 2007

(30) Foreign Application Priority Data

Nov. 30, 2004   (DE)   .................. 10 2004 057 874

(51) Int. Cl.
*C08J 3/28* (2006.01)
*C08F 20/02* (2006.01)
*C08F 20/62* (2006.01)

(52) U.S. Cl. .................. 524/556; 524/800; 524/804; 524/846; 524/849; 524/916; 526/77; 526/317.1; 526/318.5; 525/326.1; 525/326.3; 525/329.7; 523/111; 523/105

(58) Field of Classification Search .................. 524/556, 524/800, 804, 845, 849, 916; 526/77, 317.1, 526/318.5; 525/326.1, 326.3, 329.7; 523/111, 523/105

See application file for complete search history.

(56) References Cited

U.S. PATENT DOCUMENTS

| | | |
|---|---|---|
| 6,444,744 B1 * | 9/2002 | Fujimaru et al. ............ 524/556 |
| 2004/0176544 A1 | 9/2004 | Mertens et al. |
| 2006/0036043 A1 | 2/2006 | Nestler et al. |

FOREIGN PATENT DOCUMENTS

| | | |
|---|---|---|
| DE | 19630131 | 3/1997 |
| WO | WO-2004052949 | 6/2004 |
| WO | WO 2005054356 A1 * | 6/2005 |

OTHER PUBLICATIONS

Buchholz, Fredric L et al., *Modern Superabsorbent Polymer Technology*, Wiley VCH, pp. 97-103 (1998).
International Search Report in PCT/EP2005/012678 dated Mar. 1, 2006.

* cited by examiner

*Primary Examiner*—Sanza L McClendon
(74) *Attorney, Agent, or Firm*—Marshall, Gerstein & Borun LLP

(57) ABSTRACT

The present invention relates to a process for postcrosslinking water-absorbing polymeric particles in the absence of oxidizing gases, to the water-absorbing polymers preparable by the process and to their use in hygiene articles and packaging materials.

8 Claims, No Drawings

POSTCROSSLINKING OF WATER ABSORBING POLYMERIC PARTICLES

CROSS-REFERENCE TO RELATED APPLICATIONS

This is the U.S. national phase application of International Application No. PCT/EP2005/012678, filed Nov. 28, 2005, which claims the benefit of German patent application No. 10 2004 057 874.5, filed Nov. 30, 2004.

The present invention concerns a process for postcrosslinking water-absorbing polymeric particles in the absence of oxidizing gases, to the water-absorbing polymers preparable by the process and to their use in hygiene articles and packaging materials.

Further embodiments of the present invention are discernible from the claims, the description and the examples. It will be appreciated that the hereinbefore identified and the hereinafter still to be more particularly described features of the subject matter of the present invention are utilizable not only in the particular combination indicated but also in other combinations without leaving the realm of the present invention.

Water-absorbing polymers are in particular polymers of (co)polymerized hydrophilic monomers, graft (co)polymers of one or more hydrophilic monomers on a suitable grafting base, crosslinked ethers of cellulose or of starch, crosslinked carboxymethylcellulose, partially crosslinked polyalkylene oxide or natural products that are swellable in aqueous fluids, such as guar derivatives for example. Such polymers are used as products capable of absorbing aqueous solutions to manufacture diapers, tampons, sanitary napkins and other hygiene articles, but also as water-retaining agents in market gardening.

To improve their performance characteristics, such as for example Saline Flow Conductivity (SFC) in the diaper and Absorbency under Load (AUL), water-absorbing polymeric particles are generally postcrosslinked. This postcrosslinking can be carried out in the aqueous gel phase. But preferably ground and classified (base) polymeric particles are surface coated with a postcrosslinker, dried and thermally postcrosslinked. Useful crosslinkers for this purpose are compounds which comprise two or more groups capable of forming covalent bonds with the carboxylate groups of the hydrophilic polymer, or capable of linking together the at least two carboxyl groups or other functional groups of at least two different polymeric chains of the base polymer.

Postcrosslinking is described in the monograph "Modern Superabsorbent Polymer Technology", F. L. Buchholz and A. T. Graham, Wiley-VCH, 1998, pages 97 to 103. Typically, the water-absorbing polymeric particles are wetted with the postcrosslinker and thermally postcrosslinked by the polymeric particles being heated, and concurrently dried, by means of hot air or by means of contact drying. The addition of oxidizing agents in the course of postcrosslinking leads to water-absorbing polymeric particles having further improved properties.

Ultrathin articles of hygiene require water-absorbing polymeric particles of high whiteness. With ultrathin diapers, even minimal variations in color there are visible through the thin topsheet, and are not accepted by customers. But even the use of superabsorbents in thicker hygiene articles often requires a very white product for customer acceptance reasons, since yellowing is often associated with being dirty or low quality.

Nor may the water-absorbing polymeric particles give off unpleasant odors, especially when loaded with fluid.

The present invention therefore has for its object to provide an improved process for preparing water-absorbing polymeric particles which produces polymeric particles of high whiteness.

The present invention further has for its object to provide a process for preparing water-absorbing polymeric particles which produces polymeric particles which are free of noticeable odors, especially when loaded with fluid.

The present invention further has for its object to provide water-absorbing polymeric particles of high whiteness for use in hygiene articles.

We have found that this object is achieved by a process for postcrosslinking water-absorbing polymeric particles, wherein the total partial pressure of one or more oxidizing gases in the atmosphere overlying the water-absorbing polymeric particles is less than 140 mbar during drying and postcrosslinking.

The total partial pressure of the oxidizing gases is preferably less than 100 mbar, more preferably less than 50 mbar, even more preferably less than 10 mbar and most preferably less than 1 mbar.

Oxidizing gases are entities which have a vapor pressure of not less than 1013 mbar at 23° C. and act as oxidizing agents in combustion processes. examples being oxygen, nitrous oxide and nitric oxide, especially oxygen.

The oxygen partial pressure during drying and postcrosslinking in the atmosphere overlying the water-absorbing polymeric particles is preferably less than 100 mbar, more preferably less than 50 mbar, even more preferably less than 10 mbar and most preferably less than 1 mbar.

When drying and postcrosslinking are carried out at ambient pressure, i.e., at a total pressure of around 1013 mbar, or in the range from 750 to 1250 mbar, preferably in the range from 800 to 1200 mbar, even more preferably in the range from 850 to 1150 mbar and most preferably in the range from 900 to 1100 mbar, the total partial pressure of the oxidizing gases is defined via their volume fraction. The fraction of the oxidizing gases is less than 14% by volume, preferably less than 10% by volume, more preferably less than 5% by volume, even more preferably less than 1% by volume and most preferably less than 0.1% by volume.

Postcrosslinking and drying are preferably carried out at reduced pressure, i.e., at a total pressure of less than 1013 mbar. The total pressure is for example less than 670 mbar, preferably less than 480 mbar, more preferably less than 300 mbar and most preferably less than 200 mbar. When drying and postcrosslinking are carried out under air having an oxygen content of 20.8% by volume, the oxygen partial pressures corresponding to the abovementioned total pressures are 139 mbar (670 mbar), 100 mbar (480 mbar), 62 mbar (300 mbar) and 42 mbar (200 mbar), the respective total pressures being in the parentheses.

The crosslinked, water-absorbing polymeric particles are described for example in the monograph "Modern Superabsorbent Polymer Technology", F. L. Buchholz and A. T. Graham, Wiley-VCH, 1998, or in Ullmann's Encyclopedia of Industrial Chemistry, 6th edition, Volume 35, pages 73 to 103.

The crosslinked, water-absorbing polymeric particles typically have a Centrifuge Retention Capacity (CRC) in the range from 10 to 60 g/g, preferably of not less than 15 g/g, more preferably of not less than 20 g/g and most preferably of not less than 25 g/g. Centrifuge Retention Capacity (CRC) is determined by EDANA (European Disposables and Nonwovens Association) recommended test method No. 441.2-02 "Centrifuge retention capacity".

The water-absorbing polymeric particles typically have an Absorbency Under Load 0.7 psi (4.83 kPa) of not less than 15 g/g, preferably not less than 20 g/g and more preferably not less than 25 g/g. Absorbency Under Load (AUL) is determined by EDANA (European Disposables and Nonwovens Association) recommended test method No. 442.2-02 "Absorption under pressure".

Water-absorbing polymeric particles are preparable by polymerization of a monomer solution comprising
 i) at least one ethylenically unsaturated acid-functional monomer,
 ii) at least one crosslinker,
 iii) if appropriate one or more ethylenically and/or allylically unsaturated monomers copolymerizable with i), and
 iv) if appropriate one or more water-soluble polymers onto which the monomers i), ii) and if appropriate iii) can be at least partly grafted, the base polymer obtained being dried, classified, aftertreated with
 v) at least one postcrosslinker, dried and thermally postcrosslinked.

Suitable monomers i) are for example ethylenically unsaturated carboxylic acids, such as acrylic acid, methacrylic acid, maleic acid, fumaric acid and itaconic acid, or derivatives thereof, such as acrylamide, methacrylamide, acrylic esters and methacrylic esters. Acrylic acid and methacrylic acid are particularly preferred monomers. Acrylic acid is most preferable.

The monomers i) and especially acrylic acid comprise preferably up to 0.025% by weight of a hydroquinone half ether. Preferred hydroquinone half ethers are hydroquinone monomethyl ether (MEHQ) and/or tocopherols.

Tocopherol refers to compounds of the following formula:

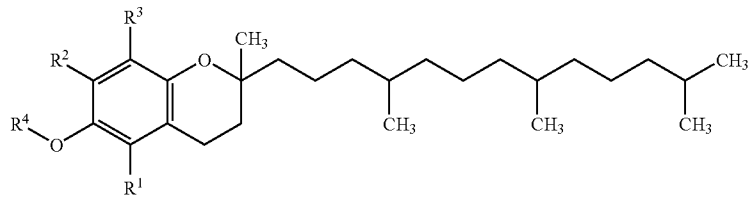

where $R^1$ is hydrogen or methyl, $R^2$ is hydrogen or methyl, $R^3$ is hydrogen or methyl and $R^4$ is hydrogen or an acyl radical of 1 to 20 carbon atoms.

Preferred $R^4$ radicals are acetyl, ascorbyl, succinyl, nicotinyl and other physiologically tolerable carboxylic acids. The carboxylic acids can be mono-, di- or tricarboxylic acids.

Preference is given to alpha-tocopherol where $R^1=R^2=R^3=$methyl, especially racemic alpha-tocopherol. $R^4$ is more preferably hydrogen or acetyl. RRR-alpha-Tocopherol is preferred in particular.

The monomer solution comprises preferably not more than 130 weight ppm, more preferably not more than 70 weight ppm, preferably not less than 10 weight ppm, more preferably not less than 30 weight ppm and especially about 50 weight ppm of hydroquinone half ether, all based on acrylic acid, with acrylic acid salts being arithmetically counted as acrylic acid. For example, the monomer solution can be produced using an acrylic acid having an appropriate hydroquinone half ether content.

The water-absorbing polymers are in a crosslinked state, i.e., the addition polymerization is carried out in the presence of compounds having two or more polymerizable groups which can be free-radically interpolymerized into the polymer network. Useful crosslinkers ii) include for example ethylene glycol dimethacrylate, diethylene glycol diacrylate, allyl methacrylate, trimethylolpropane triacrylate, triallylamine, tetraallyloxyethane as described in EP-A 530 438, di- and triacrylates as described in EP-A 547 847, EP-A 559 476, EP-A 632 068, WO 93/21237, WO 03/104299, WO 03/104300, WO 03/104301 and in German patent application 103 31 450.4, mixed acrylates which, as well as acrylate groups, comprise further ethylenically unsaturated groups, as described in German patent applications 103 31 456.3 and 103 55 401.7, or crosslinker mixtures as described for example in DE-A 195 43 368, DE-A 196 46 484, WO 90/15830 and WO 02/32962.

Useful crosslinkers ii) include in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate, ethylene glycol dimethacrylate and also trimethylolpropane triacrylate and allyl compounds, such as allyl (meth) acrylate, triallyl cyanurate, diallyl maleate, polyallyl esters, tetraallyloxyethane, triallylamine, tetraallylethylenediamine, allyl esters of phosphoric acid and also vinylphosphonic acid derivatives as described for example in EP-A 343 427. Useful crosslinkers ii) further include pentaerythritol diallyl ether, pentaerythritol triallyl ether, pentaerythritol tetraallyl ether, polyethylene glycol diallyl ether, ethylene glycol diallyl ether, glycerol diallyl ether, glycerol triallyl ether, polyallyl ethers based on sorbitol, and also ethoxylated variants thereof. The process of the present invention utilizes di(meth) acrylates of polyethylene glycols, the polyethylene glycol used having a molecular weight between 300 and 1000.

However, particularly advantageous crosslinkers ii) are di- and triacrylates of 3- to 20-tuply ethoxylated glycerol, of 3- to 20-tuply ethoxylated trimethylolpropane, of 3- to 20-tuply ethoxylated trimethylolethane, especially di- and triacrylates of 2- to 6-tuply ethoxylated glycerol or of 2- to 6-tuply ethoxylated trimethylolpropane, of 3-tuply propoxylated glycerol, of 3-tuply propoxylated trimethylolpropane, and also of 3-tuply mixedly ethoxylated or propoxylated glycerol, of 3-tuply mixedly ethoxylated or propoxylated trimethylolpropane, of 15-tuply ethoxylated glycerol, of 15-tuply ethoxylated trimethylolpropane, of 40-tuply ethoxylated glycerol, of at least 40-tuply ethoxylated trimethylolethane and also of at least 40-tuply ethoxylated trimethylolpropane.

Very particularly preferred for use as crosslinkers ii) are diacrylated, dimethacrylated, triacrylated or trimethacrylated multiply ethoxylated and/or propoxylated glycerols as described for example in prior German patent application DE 103 19 462.2. Di- and/or triacrylates of 3- to 10-tuply ethoxylated glycerol are particularly advantageous. Very particular preference is given to di- or triacrylates of 1- to 5-tuply ethoxylated and/or propoxylated glycerol. The triacrylates of 3- to 5-tuply ethoxylated and/or propoxylated glycerol are most preferred. These are notable for particularly low residual levels (typically below 10 ppm) in the water-absorbing polymer and the aqueous extracts of water-absorbing polymers produced therewith have an almost unchanged surface tension compared with water at the same temperature (typically not less than 0.068 N/m).

Examples of ethylenically unsaturated monomers iii) which are copolymerizable with the monomers i) are acrylamide, methacrylamide, crotonamide, dimethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, dimethylaminoneopentyl acrylate and dimethylaminoneopentyl methacrylate.

Useful water-soluble polymers iv) include polyvinyl alcohol, polyvinylpyrrolidone, starch, starch derivatives, polyglycols or polyacrylic acids, preferably polyvinyl alcohol and starch.

The preparation of a suitable base polymer and also further useful hydrophilic ethylenically unsaturated monomers i) are described in DE-A 199 41 423, EP-A 686 650, WO 01/45758 and WO 03/14300.

The reaction is preferably carried out in a kneader as described for example in WO 01/38402, or on a belt reactor as described for example in EP-A-955 086.

The acid groups of the hydrogels obtained are typically in a partially neutralized state, the extent of neutralization preferably being in the range from 25 to 95 mol %, more preferably in the range from 27 to 80 mol % and even more preferably in the range from 27 to 30 mol % or from 40 to 75 mol %, for which the customary neutralizing agents can be used, for example alkali metal hydroxides, alkali metal oxides, alkali metal carbonates or alkali metal bicarbonates and also mixtures thereof. Ammonium salts can also be used instead of alkali metal salts. Sodium and potassium are particularly preferred as alkali metals, but most preference is given to sodium hydroxide, sodium carbonate or sodium bicarbonate and also mixtures thereof. Typically, neutralization is achieved by admixing the neutralizing agent as an aqueous solution, as a melt or else preferably as a solid material. For example, sodium hydroxide having a water fraction of distinctly below 50% by weight can be present as a waxy mass having a melting point above 23° C. In this case, metering as piece goods or melt at elevated temperature is possible.

Neutralization can be carried out after polymerization, at the hydrogel stage. But it is also possible to neutralize up to 40 mol %, preferably from 10 to 30 mol % and more preferably from 15 to 25 mol % of the acid groups before polymerization by adding a portion of the neutralizing agent to the monomer solution and setting the desired final degree of neutralization only after polymerization, at the hydrogel stage. The monomer solution may be neutralized by admixing the neutralizing agent. The hydrogel can be mechanically comminuted, for example by means of a meat grinder, in which case the neutralizing agent can be sprayed, sprinkled or poured on and then carefully mixed in. To this end, the gel mass obtained can be repeatedly minced for homogenization. Neutralization of the monomer solution directly to the final degree of neutralization is preferred.

The neutralized hydrogel is then dried with a belt or drum dryer until the residual moisture content is preferably below 15% by weight and especially below 10% by weight, the water content being determined by EDANA (European Disposables and Nonwovens Association) recommended test method No. 430.2-02 "Moisture content". Selectively, drying can also be carried out using a fluidized bed dryer or a heated plowshare mixer. To obtain particularly white products, it is advantageous to dry this gel by ensuring rapid removal of the evaporating water. To this end, the dryer temperature must be optimized, the air feed and removal has to be policed, and at all times sufficient venting must be ensured. Drying is naturally all the more simple—and the product all the more white—when the solids content of the gel is as high as possible. The solids content of the gel prior to drying is therefore preferably between 30% and 80% by weight. It is particularly advantageous to vent the dryer with nitrogen or some other non-oxidizing inert gas. Selectively, however, simply just the partial pressure of the oxygen can be lowered during drying to prevent oxidative yellowing processes. But in general adequate venting and removal of the water vapor will likewise still lead to an acceptable product. A very short drying time is generally advantageous with regard to color and product quality.

A further important function of drying the gel is the ongoing reduction in the residual monomer content of the superabsorbent. This is because any residual initiator will decompose to free radicals during drying, leading to any residual monomers becoming interpolymerized. In addition, the evaporating amounts of water will entrain any free water-vapor-volatile monomers still present, such as acrylic acid for example, and thus likewise lower the residual monomer content of the superabsorbent.

The dried hydrogel is then ground and sieved, useful grinding apparatus typically including single or multiple stage roll mills, preferably two or three stage roll mills, pin mills, hammer mills or swing mills.

The base polymers are subsequently postcrosslinked. Useful postcrosslinkers v) are compounds comprising two or more groups capable of forming covalent bonds with the carboxylate groups of the polymers. Useful compounds are for example alkoxysilyl compounds, polyaziridines, polyamines, polyamidoamines, di- or polyglycidyl compounds as described in EP-A 083 022, EP-A 543 303 and EP-A 937 736, polyhydric alcohols as described in DE-C 33 14 019, DE-C 35 23 617 and EP-A 450 922, or β-hydroxyalkylamides as described in DE-A 102 04 938 and U.S. Pat. No. 6,239,230. It is also possible to use compounds of mixed functionality, such as glycidol, 3-ethyl-3-oxetanemethanol (trimethylolpropaneoxetane), as described in EP-A 1 199 327, aminoethanol, diethanolamine, triethanolamine or compounds which develop a further functionality after the first reaction, such as ethylene oxide, propylene oxide, isobutylene oxide, aziridine, azetidine or oxetane.

Useful postcrosslinkers v) are further said to include by DE-A 40 20 780 cyclic carbonates, by DE-A 198 07 502 2-oxazolidone and its derivatives, such as N-(2-hydroxyethyl)-2-oxazolidone, by DE-A 198 07 992 bis- and poly-2-oxazolidones, by DE-A 198 54 573 2-oxotetrahydro-1,3-oxazine and its derivatives, by DE-A 198 54 574 N-acyl-2-oxazolidones, by DE-A 102 04 937 cyclic ureas, by German patent application 103 34 584.1 bicyclic amide acetals, by EP-A 1 199 327 oxetanes and cyclic ureas and by WO 03/031482 morpholine-2,3-dione and its derivatives.

Postcrosslinking is typically carried out by spraying a solution of the postcrosslinker onto the hydrogel or the dry base-polymeric particles. Spraying is followed by thermal drying, and the postcrosslinking reaction can take place not only before but also during drying.

Preferred postcrosslinkers v) are amide acetals or carbamic esters of the general formula I

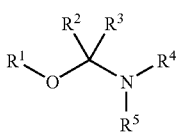
(I)

where
- $R^1$ is $C_1$-$C_{12}$-alkyl, $C_2$-$C_{12}$-hydroxyalkyl, $C_2$-$C_{12}$-alkenyl or $C_6$-$C_{12}$-aryl,
- $R^2$ is X or $OR^6$
- $R^3$ is hydrogen, $C_1$-$C_{12}$-alkyl, $C_2$-$C_{12}$-hydroxyalkyl, $C_2$-$C_{12}$-alkenyl or $C_6$-$C_{12}$-aryl, or X,
- $R^4$ is $C_1$-$C_{12}$-alkyl, $C_2$-$C_{12}$-hydroxyalkyl, $C_2$-$C_{12}$-alkenyl or $C_6$-$C_{12}$-aryl
- $R^5$ is hydrogen, $C_1$-$C_{12}$-alkyl, $C_2$-$C_{12}$-hydroxyalkyl, $C_2$-$C_{12}$-alkenyl, $C_1$-$C_{12}$-acyl or $C_6$-$C_{12}$-aryl,
- $R^6$ is $C_1$-$C_{12}$-alkyl, $C_2$-$C_{12}$-hydroxyalkyl, $C_2$-$C_{12}$-alkenyl or $C_6$-$C_{12}$-aryl and
- X is a carbonyl oxygen common to $R^2$ and $R^3$, wherein $R^1$ and $R^4$ and/or $R^5$ and $R^6$ can be a bridged $C_2$-$C_6$-alkanediyl and wherein the abovementioned radicals $R^1$ to $R^6$ can still have in total one to two free valences and can be attached through these free valences to at least one suitable basic structure, or polyhydric alcohols, in which case the molecular weight of the polyhydric alcohol is preferably less than 100 g/mol, preferably less than 90 g/mol, more preferably less than 80 g/mol and most preferably less than 70 g/mol per hydroxyl group and the polyhydric alcohol has no vicinal, geminal, secondary or tertiary hydroxyl groups, and polyhydric alcohols are either diols of the general formula IIa

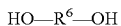
(IIa)

where $R^6$ is either an unbranched dialkyl radical of the formula —$(CH_2)_n$—, where n is an integer from 3 to 20 and preferably from 3 to 12, although 4 is less preferable, and both the hydroxyl groups are terminal, or an unbranched, branched or cyclic dialkyl radical or polyols of the general formula IIb

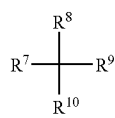
(IIb)

where $R^7$, $R^8$, $R^9$ and $R^{10}$ are independently hydrogen, hydroxyl, hydroxymethyl, hydroxyethyloxymethyl, 1-hydroxyprop-2-yloxymethyl, 2-hydroxypropyloxymethyl, methyl, ethyl, n-propyl, isopropyl, n-butyl, n-pentyl, n-hexyl, 1,2-dihydroxyethyl, 2-hydroxyethyl, 3-hydroxypropyl or 4-hydroxybutyl and in total 2, 3 or 4 and preferably 2 or 3 hydroxyl groups are present, and not more than one of $R^7$, $R^8$, $R^9$ and $R^{10}$ is hydroxyl, or cyclic carbonates of the general formula III

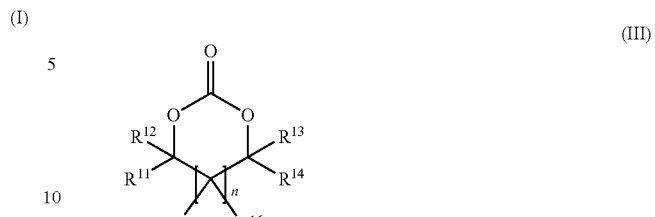
(III)

where $R^{11}$, $R^{12}$, $R^{13}$, $R^{14}$, $R^{15}$ and $R^{16}$ are independently hydrogen, methyl, ethyl, n-propyl, isopropyl, n-butyl, sec-butyl or isobutyl, and n is either 0 or 1, or bisoxazolines of the general formula IV

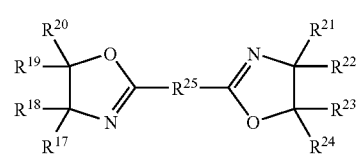
(IV)

where $R^{17}$, $R^{18}$, $R^{19}$, $R^{20}$, $R^{21}$, $R^{22}$, $R^{23}$ and $R^{24}$ are independently hydrogen, methyl, ethyl, n-propyl, isopropyl, n-butyl, sec-butyl or isobutyl and $R^{25}$ is a single bond, a linear, branched or cyclic $C_1$-$C_{12}$-dialkyl radical or polyalkoxydiyl radical which is constructed of one to ten ethylene oxide and/or propylene oxide units, as possessed by polyglycoldicarboxylic acids for example.

Preferred postcrosslinkers v) are extremely selective. Byproducing and secondary reactions which lead to volatile and hence malodorous compounds are minimized. The water-absorbing polymers produced with preferred postcrosslinkers v) are therefore odor neutral even in the moistened state.

Epoxy compounds, by contrast, may at high temperatures in the presence of suitable catalysts undergo various rearrangement reactions which lead to aldehydes or ketones for example. These can then undergo further secondary reactions which eventually lead to the formation of malodorous impurities which are undesirable in hygiene articles on account of their odor. Therefore, epoxy compounds are less suitable for postcrosslinking above a temperature of about 140 to 150° C. Amino- or imino-comprising postcrosslinkers v) will at similar temperatures undergo even more involved rearrangement reactions which tend to give rise to malodorous trace impurities and brownish product discolorations.

Polyhydric alcohols employed as postcrosslinkers v) require high postcrosslinking temperatures on account of their low reactivity. Alcohols comprising vicinal, geminal, secondary and tertiary hydroxyl groups, when employed as postcrosslinkers, give rise to byproducts which are undesirable in the hygiene sector because they lead to unpleasant odors and/or discolorations of the corresponding hygiene article during manufacture or use.

Preferred postcrosslinkers v) of the general formula I are 2-oxazolidones, such as 2-oxazolidone and N-hydroxyethyl-2-oxazolidone, N-methyl-2-oxazolidone, N-acyl-2-oxazolidones, such as N-acetyl-2-oxazolidone, 2-oxotetrahydro-1,3-oxazine, bicyclic amide acetals, such as 5-methyl-1-aza-4,6-dioxabicyclo[3.3.0]octane, 1-aza-4,6-dioxa-bicyclo[3.3.0]octane and 5-isopropyl-1-aza-4,6-dioxabicyclo[3.3.0]octane, bis-2-oxazolidones and poly-2-oxazolidones.

Particularly preferred postcrosslinkers v) of the general formula I are 2-oxazolidone, N-methyl-2-oxazolidone, N-hydroxyethyl-2-oxazolidone and N-hydroxypropyl-2-oxazolidone.

Preferred postcrosslinkers v) of the general formula IIa are 1,3-propanediol, 1,5-pentanediol, 1,6-hexanediol and 1,7-heptanediol. Further examples of postcrosslinkers of the formula IIa are 1,3-butanediol, 1,8-octanediol, 1,9-nonanediol and 1,10-decanediol.

The diols IIa are preferably soluble in water in that the diols of the general formula IIa dissolve in water at 23° C. to an extent of not less than 30% by weight, preferably not less than 40% by weight, more preferably not less than 50% by weight and most preferably not less than 60% by weight, examples being 1,3-propanediol and 1,7-heptanediol. Even more preference is given to such postcrosslinkers as are liquid at 25° C.

Preferred postcrosslinkers v) of the general formula IIb are 1,2,3-butanetriol, 1,2,4-butanetriol, glycerol, trimethylolpropane, trimethylolethane, pentaerythritol, ethoxylated glycerol, trimethylolethane or trimethylolpropane each having 1 to 3 ethylene oxide units per molecule and propoxylated glycerol, trimethylolethane or trimethylolpropane each having 1 to 3 propylene oxide units per molecule. Preference is further given to 2-tuply ethoxylated or propoxylated neopentylglycol. Particular preference is given to 2-tuply and 3-tuply ethoxylated glycerol neopentylglycol, 2-methyl-1,3-propanediol and trimethylolpropane.

Preferred polyhydric alcohols IIa and IIb have a 23° C. viscosity of less than 3000 mPas, preferably less than 1500 mPas, more preferably less than 1000 mPas, even more. preferably less than 500 mPas and most preferably less than 300 mPas.

Particularly preferred postcrosslinkers v) of the general formula III are ethylene carbonate and propylene carbonate.

A particularly preferred postcrosslinker v) of the general formula IV is 2,2'-bis(2-oxazoline).

The at least one postcrosslinker v) is typically used in an amount of not more than 0.30% by weight, preferably not more than 0.15% by weight and more preferably in the range from 0.001% to 0.095% by weight, all percentages being based on the base polymer, as an aqueous solution.

It is possible to use a single postcrosslinker v) from the above selection or any desired mixtures of various postcrosslinkers.

The aqueous postcrosslinking solution, as well as the at least one postcrosslinker v), can typically further comprise a cosolvent.

Cosolvents which are technically highly useful are $C_1$-$C_6$-alcohols, such as methanol, ethanol, n-propanol, isopropanol, n-butanol, sec-butanol, tert-butanol or 2-methyl-1-propanol, $C_2$-$C_5$-diols, such as ethylene glycol, 1,2-propylene glycol or 1,4-butanediol, ketones, such as acetone, or carboxylic esters, such as ethyl acetate. The disadvantage with many of these cosolvents is that they have characteristic intrinsic odors.

The cosolvent itself is ideally not a postcrosslinker under the reaction conditions. However, in a borderline case and depending on the residence time and the temperature, the cosolvent may to some extent contribute to crosslinking. This will be the case in particular when the postcrosslinker v) is relatively inert and therefore is itself also able to form its cosolvent, as with the use for example of cyclic carbonates of the general formula III, diols of the general formula IIa or polyols of the general formula IIb. Such postcrosslinkers v) can also be used as cosolvent when admixed with more reactive postcrosslinkers v), since the actual postcrosslinking reaction can then be carried out at lower temperatures and/or shorter residence times than in the absence of the more reactive crosslinker v). Since the cosolvent is used in relatively large amounts and will also remain to some extent in the product, it must not be toxic.

The diols of the general formula IIa, the polyols of the general formula IIb and also the cyclic carbonates of the general formula III are also useful as cosolvents in the process of the present invention. They perform this function in the presence of a reactive postcrosslinker v) of the general formula I and/or IV and/or of a di- or triglycidyl crosslinker. However, preferred cosolvents in the process of the present invention are in particular the diols of the general formula IIa, especially when the hydroxyl groups are sterically hindered by neighboring groups from participating in a reaction. Such diols are in principle also useful as postcrosslinkers v), but for this require distinctly higher reaction temperatures or if appropriate higher use levels than sterically unhindered diols.

Particularly preferred cosolvents in the process of the present invention further include the polyols of the general formula IIb. Among these, the 2- to 3-tuply alkoxylated polyols are preferred in particular. But particularly useful cosolvents further include 3- to 15-tuply and most particularly 5- to 10-tuply ethoxylated polyols based on glycerol, trimethylolpropane, trimethylolethane or pentaerythritol. Seven-tuply ethoxylated trimethylolpropane is particularly useful.

Suitable sterically hindered and hence reaction-inert polyhydric alcohols further include polyhydric alcohols of no particular molecular weight which are free of vicinal, geminal or secondary hydroxyl groups.

Examples of such sterically hindered diols of the general formula IIa which are therefore particularly preferred for use as a cosolvent are 2,2-dimethyl-1,3-propanediol (neopentylglycol), 2-methyl-1,3-propanediol and 2,4-dimethylpentane-2,4-diol.

Useful cosolvents further include di(trimethylolpropane) and also 5-ethyl-1,3-dioxane-5-methanol.

Particularly preferred combinations of less reactive postcrosslinker v) as cosolvent and reactive postcrosslinker v) are combinations of preferred polyhydric alcohols, diols of the general formula IIa and polyols of the general formula IIb, with amide acetals or carbamic esters of the general formula I.

Very particularly preferred combinations are 2-oxazolidone/1,3-propanediol and N-(2-hydroxyethyl)-2-oxazolidone/1,3-propanediol.

Further preferred combinations are those with ethylene glycol diglycidyl ether or glycerol diglycidyl or triglycidyl ether with the following solvents, cosolvents or cocrosslinkers: isopropanol, 1,3-propanediol, 2-methyl-1,3-propanediol, neopentyl glycol, 1,5-pentanediol, 1,6-hexanediol, 1,7-heptanediol or mixtures thereof.

The boiling point of the cosolvent is preferably no higher than 160° C., more preferably no higher than 140° C. and most preferably no higher than 120° C. or preferably no lower than 200° C., more preferably no lower than 220° C. and most preferably no lower than 250° C.

Particularly useful cosolvents in the process of the present invention therefore also include those which form a low boiling azeotrope with water or with a second cosolvent. The boiling point of this azeotrope is preferably no higher than 160° C., more preferably no higher than 140° C. and most preferably no higher than 120° C. Water vapor volatile cosolvents are likewise very useful, since they can be wholly or partly removed with the water evaporating in the course of drying.

Postcrosslinkers v) and cosolvents having a boiling point surprisingly lead to water-absorbing polymeric particles having an undesirable chemical odor which is not distinctly above or below the temperature in the postcrosslinking dryer often lead surprisingly and the polymers are severely yellowed and often comprise black specks and other impurities.

The concentration of cosolvent in the aqueous postcrosslinker solution is frequently in the range from 15% to 50% by weight, preferably in the range from 15% to 40% by weight and more preferably in the range from 20% to 35% by weight, based on the postcrosslinker solution. In the case of cosolvents having a but limited miscibility with water, it will be advantageous to adjust the aqueous postcrosslinker solution such that there is only one phase, if appropriate by lowering the concentration of cosolvent.

A preferred embodiment does not utilize any cosolvent. The at least one postcrosslinker v) is then only employed as a solution in water, with or without an added deagglomerating assistant.

The concentration of the at least one postcrosslinker v) in the aqueous postcrosslinker solution is for example in the range from 1% to 20% by weight, preferably in the range from 1.5% to 10% by weight and more preferably in the range from 2% to 5% by weight, based on the postcrosslinker solution.

The total amount of postcrosslinker solution based on base polymer is usually in the range from 0.3% to 15% by weight and preferably in the range from 2% to 6% by weight.

In a preferred embodiment, the base polymer is admixed with a surfactant deagglomerating assistant, for example a sorbitan monoester, such as sorbitan mono-cocoate and sorbitan monolaurate, or ethoxylated variants thereof, such as for example Polysorbat 20®. Very useful deagglomerating assistants further include the ethoxylated and alkoxylated derivatives of 2-propylheptanol, which are marketed by BASF AG of Germany under the brandnames of Lutensol XL® and Lutensol XP®. The deagglomerating assistant can be added separately or to the postcrosslinker solution. Preferably the deagglomerating assistant is added to the postcrosslinker solution.

The useful level of deagglomerating assistant based on base polymer is for example in the range from 0% to 0.1% by weight, preferably in the range from 0% to 0.01% by weight and more preferably in the range from 0% to 0.002% by weight. The deagglomerating assistant is preferably dosed such that the surface tension of an aqueous extract of the swollen base polymer and/or of the swollen postcrosslinked water-absorbing polymer is not less than 0.060 N/m, preferably not less than 0.062 N/m and more preferably not less than 0.065 N/m and advantageously not more than 0.072 N/m, at 23° C.

The dried base polymer used in the process of the present invention typically has a residual moisture content in the range from 0% to 13% by weight and preferably in the range from 2% to 9% by weight after drying and before application of the postcrosslinking solution. Optionally, however, this moisture content can also be raised up to 75% by weight, for example by applying water in an upstream spraying mixer. The moisture content is determined by EDANA (European Disposables and Nonwovens Association) recommended test method No. 430.2-02 "Moisture content". Such an increase in the moisture content leads to a slight preswelling of the base polymer and improves the distribution of the crosslinker on the surface and also the penetration through the particles.

Spray nozzles useful in the process of the present invention are not subject to any restriction. Suitable nozzles and atomizing systems are described for example in the following literature references: Zerstäuben von Flüssigkeiten, Expert-Verlag, volume 660, Reihe Kontakt & Studium, Thomas Richter (2004) and also in Zerstäubungstechnik, Springer-Verlag, VDI-Reihe, Günter Wozniak (2002). Mono- and polydisperse spraying systems can be used. Suitable polydisperse systems include one-material pressure nozzles (forming a jet or lamellae), rotary atomizers, two-material atomizers, ultrasonic atomizers and impact nozzles. With regard to two-material atomizers, the mixing of the liquid phase with the gas phase can take place not only internally but also externally. The spray pattern produced by the nozzles is not critical and can assume any desired shape, for example a round jet, flat jet, wide angle round jet or circular ring. The use of a non-oxidizing gas is advantageous when two-material atomizers are used, particular preference being given to nitrogen, argon or carbon dioxide. Such nozzles can be pressure fed with the liquid to be spray dispensed. The atomizing of the liquid to be spray dispensed can in this case be effected by decompressing the liquid in the nozzle bore after the liquid has reached a certain minimum velocity. Also useful are one-material nozzles, for example slot nozzles or swirl or whirl chambers (full cone nozzles) (available for example from Düsen-Schlick GmbH, Germany or from Spraying Systems Deutschland GmbH, Germany). Such nozzles are also described in EP-A-0 534 228 and EP-A-1 191 051.

After spraying, the polymeric powder is thermally dried, and the postcrosslinking reaction can take place before, during or after drying.

The spraying with the solution of postcrosslinker is preferably carried out in mixers having moving mixing implements, such as screw mixers, paddle mixers, disk mixers, plowshare mixers and shovel mixers. Particular preference is given to vertical mixers and very particular preference to plowshare mixers and shovel mixers. Useful mixers include for example Lödige® mixers, Bepex® mixers, Nauta® mixers, Processall® mixers and Schugi® mixers.

Contact dryers are preferable, shovel dryers more preferable and disk dryers most preferable as apparatus in which thermal drying is carried out. Suitable dryers include for example Bepex® dryers and Nara® dryers. Fluidized bed dryers, for example Carman® dryers, can be used as well.

Drying can take place in the mixer itself, for example by heating the shell or blowing hot inert gases into it. It is similarly possible to use a downstream dryer, for example a tray dryer, a rotary tube oven or a heatable screw. But it is also possible for example to utilize an azeotropic distillation as a drying process.

It is particularly preferable to apply the solution of postcrosslinker in a high speed mixer, for example of the Schugi-Flexomix® or Turbolizer® type, to the base polymer and the latter can then be thermally postcrosslinked in a reaction dryer, for example of the Nara-Paddle-Dryer® type or a disk dryer. The base polymer used can still have a temperature in the range from 10 to 120° C. from preceding operations, and the postcrosslinking solution can have a temperature in the range from 0 to 150° C. More particularly, the postcrosslinking solution can be heated to lower the viscosity. The preferred postcrosslinking and drying temperature range is from 30 to 220° C., especially from 120 to 210° C. and most preferably from 145 to 190° C. The preferred residence time at this temperature in the reaction mixer or dryer is below 100 minutes, more preferably below 70 minutes and most preferably below 40 minutes. When a fluidized bed dryer is used, the residence time is preferably below 30 minutes, more preferably below 20 minutes and most preferably below 10 minutes.

The postcrosslinking dryer in the process of the present invention is preferably purged with an inert gas during the drying and postcrosslinking reaction in order that the vapors may be removed and oxidizing gases, such as atmospheric oxygen, may be displaced. To augment the drying process, the dryer and the attached assemblies are thermally well-insulated and ideally fully heated.

Suitable inert gases are for example nitrogen, carbon dioxide, argon, water vapor, of which nitrogen is preferred. The inert gas rate is preferably in the range from 0.0001 to 10 m$^3$, preferably in the range from 0.001 to 5 m$^3$, more preferably in the range from 0.005 to 1 m$^3$ and most preferably in the range from 0.005 to 0.1 m$^3$ based on 1 kg of water-absorbing polymeric particles.

Inert gases in the process of the present invention are entities which are present in gaseous form at the postcrosslinking temperature and given pressure in the postcrosslinking dryer and which under these conditions do not have an oxidizing effect on the constituents of the drying superabsorbent. The inside of the postcrosslinking dryer is preferably at atmospheric pressure, or else selectively at a slight under- or overpressure.

To produce a very white polymer, the gas space in the dryer is kept as free as possible of oxidizing gases in the process of the present invention. It is possible according to the present invention to heat the polymeric powder via contact surfaces in the dryer or via added warm inert gas, or via a mixture of one or more inert gases with water vapor, or with water vapor alone. When the heat is supplied via contact surfaces it is possible to carry out the reaction under inert gas at slight or complete underpressure. When water vapor is used to directly heat the polymeric powder, it is desirable according to the present invention to operate the dryer at atmospheric pressure or overpressure. In this case it can be sensible to split the postcrosslinking step into a heating step and a reaction step under inert gas but without water vapor. This can be actualized in one or more apparatuses. According to the present invention, the polymer can be heated with water vapor in the postcrosslinking mixer.

In the process of the present invention, the inert gas can be blown, if it does not comprise water vapor, into the postcrosslinking dryer via nozzles, but it is particularly preferable to add the inert gas to the polymer stream in or shortly upstream of the postcrosslinking mixer, via nozzles. For example, the oxygen content in the atmosphere of the postcrosslinking dryer or of the postcrosslinking mixer can be policed via oxygen probes.

Cosolvents removed with the vapors may of course be condensed again outside the reaction dryer and if appropriate recycled.

After the reactive drying step has been concluded, the dried water-absorbing polymeric particles are cooled. To this end, the warm and dry polymer is preferably continuously transferred into a downstream cooler. This can be for example a disk cooler, a Nara paddle cooler or a screw cooler. Cooling is via the walls and if appropriate the stirring elements of the cooler, through which a suitable cooling medium such as for example warm or cold water flows. Selectively, however, a fluidized bed cooler may also be used. Water or aqueous solutions of additives may preferably be sprayed on in the cooler; this increases the efficiency of cooling (partial evaporation of water) and the residual moisture content in the finished product can be adjusted to a value in the range from 0% to 6% by weight, preferably in the range from 0.01% to 4% by weight and more preferably in the range from 0.1% to 3% by weight. The increased residual moisture content reduces the dust content of the product.

Optionally, however, it is possible to use the cooler for cooling only and to carry out the addition of water and additives in a downstream separate mixer. Cooling stops the reaction by lowering the temperature to below the reaction temperature and the temperature needs altogether only to be lowered to such an extent that the product is easily packable into plastic bags or into silo trucks.

Optionally, however, all known coatings, such as film forming polymers, dendrimers, polycationic polymers (such as polyvinylamine, polyethyleneimine or polyallylamine), water-insoluble polyvalent metal salts, such as calcium sulfate or calcium phosphate, water-soluble polyvalent metal salts, such as aluminum sulfate, calcium or magnesium salts, or hydrophilic inorganic particles, such as clay minerals, pyrogenic silica, alumina and magnesia, can be additionally applied. This makes it possible to achieve additional effects, such as a reduced tendency to cake, improved processing properties or a further enhanced Saline Flow Conductivity (SFC). When the additives are used and sprayed in the form of dispersions, they are preferably used as aqueous dispersions, and it is preferable to additionally apply a dustproofing agent to fix the additive on the surface of the water-absorbing polymer. The dustproofing agent is then added directly to the dispersion of the inorganic pulverulent additive, but optionally it can be added as a separate solution before, during or after the application of the inorganic pulverulent additive, by spraying. The concurrent spraying with postcrosslinking agent, dustproofing agent and pulverulent inorganic additive in surface postcrosslinking is most preferable. In a further preferred version of the process, however, the dustproofing agent is added separately in the cooler, for example by spraying from top, from the bottom or from the side. Particularly suitable dustproofing agents which can also serve to fix pulverulent inorganic additives to the surface of the water-absorbing polymeric particles are polyethylene glycols having a molecular weight in the range from 400 to 20000 g/mol, polyglycerol, 3- to 100-tuply ethoxylated polyols, such as trimethylolpropane, glycerol, sorbitol and neopentylglycol. Of particular suitability are 7- to 20-tuply ethoxylated glycerol or trimethylolpropane, such as for example Polyol TP 70® (Perstorp, Sweden). The latter have the particular advantage that they only insignificantly lower the surface tension of an aqueous extract of the water-absorbing hydrogel.

In a particularly preferred embodiment of the invention, calcium phosphate (for example TCP 130, from Rhodia), postcrosslinker (preferably 2-oxazolidone and/or 1,3-propanediol and/or 1,2-propanediol), organic solvent (preferably isopropanol), dustproofing agent (preferably at least 7-tuply ethoxylated glycerol, trimethylolpropane or trimethylolethane) and if appropriate some surfactant (preferably Spans 20) are suspended with water to form a dispersion and then applied by means of a spray mixer (preferably Schugi-Mix) to the polymer by means of a two-material nozzle or a one-material nozzle, not only the spray mixer but also the downstream postcrosslinking dryer being purged with inert gas (preferably nitrogen) such that the oxygen volume fraction in these assemblies is less than 14% by volume, preferably lower than 10% by volume and most preferably not more than 8% by volume.

In a further preferred embodiment of the invention, the postcrosslinker (preferably 2-oxazolidone and/or 1,3-propanediol and/or 1,2-propanediol), organic solvent (preferably isopropanol) and a portion of the total water are prepared as a solution, the calcium phosphate (for example TCP 130, from Rhodia) and the rest of the water are made into a dispersion, and the remaining components, dustproofing agent (preferably at least 7-tuply ethoxylated glycerol, trimethylolpropane or trimethylolethane) and if appropriate some surfactant (preferably Span® 20) can be selectively incorporated into the postcrosslinker solution or into the dispersion, and the two solutions thus produced should have the same composition when mixed together as in the above-described embodiment. The two solutions are then sprayed concurrently through separate nozzles in the spray mixer onto the base polymer.

The process of the present invention provides water-absorbing polymeric particles of high whiteness.

The present invention accordingly also provides water-absorbing polymeric particles obtainable by the process of the present invention. The whiteness of the water-absorbing polymeric particles is determined via the Hunter 60 value, which value is preferably not less than 60, more preferably not less than 70, even more preferably not less than 80 and most preferably not less than 85.

Furthermore, the water-absorbing polymeric particles of the present invention are substantially free of compounds which lead to unpleasant odors during use in particular.

The present invention further provides hygiene articles comprising water-absorbing polymeric particles according to the present invention, preferably ultrathin diapers comprising an absorbent layer consisting of 50% to 100% by weight, preferably 60% to 100% by weight, more preferably 70% to 100% by weight, even more preferably 80% to 100% by weight and most preferably 90% to 100% by weight of water-absorbing polymeric particles according to the present invention, the closure surrounding the absorbent layer not included of course.

The water-absorbing polymeric particles of the present invention are also very advantageous for producing laminates and composite structures as described for example in US-A 2003/0181115 and US-A 2004/0019342. As well as the hotmelt adhesives described in the two references for producing such novel absorbent structures, and especially the hotmelt adhesive fibers which are described in US-A 2003/0181115 and to which the water-absorbing polymeric particles is bound, the water-absorbing polymeric particles of the present invention are also useful for producing completely analogous structures by utilizing UV crosslinkable hotmelt adhesives which are marketed for example as AC-Resins (BASF AG, Germany). These UV crosslinkable hotmelt adhesives have the advantage of being processible at as low as 120 to 140° C.; therefore, they have better compatibility with many thermoplastic substrates. It is a further significant advantage that UV crosslinkable hotmelt adhesives are generally recognized as very safe by toxicologists and do not cause any outgassing in hygiene articles. A very significant advantage in connection with the water-absorbing polymeric particles of the present invention is the property of UV crosslinkable hotmelt adhesives not to yellow during processing and crosslinking. This is advantageous especially when ultrathin or partially transparent hygiene articles are to be produced. The combination of the water-absorbing polymeric particles of the present invention with UV crosslinkable hotmelt adhesives is therefore particularly advantageous. Suitable UV crosslinkable hotmelt adhesives are described for example in EP-A 377 199, EP-A 445 641, U.S. Pat. No. 5,026,806, EP-A 655 465 and EP-A 377 191.

To determine the quality of postcrosslinking, the dried water-absorbing polymeric particles are tested using the test methods described hereinbelow.

Methods:

The measurements should be carried out, unless otherwise stated, at an ambient temperature of 23±2° C. and a relative humidity of 50±10%. The water-absorbing polymeric particles are thoroughly mixed through before measurement.

Centrifuge Retention Capacity (CRC)

Centrifuge Retention Capacity is determined by EDANA (European Disposables and Nonwovens Association) recommended test method No. 441.2-02 "Centrifuge retention capacity".

Absorbency Under Load (AUL)

Absorbency under Load is determined by EDANA (European Disposables and Nonwovens Association) recommended test method No. 442.2-02 "Absorption under pressure".

Saline Flow Conductivity (SFC)

The flow conductivity of a swollen layer of gel under a confining pressure of 0.3 psi (2070 Pa) is determined as described in EP-A 640 330 as the Gel Layer Permeability of a swollen gel layer of water-absorbing polymeric particles, although the apparatus described in the aforementioned patent application at page 19 and FIG. 8 was modified to the effect that the glass frit (40) is no longer used, the piston (39) is made of the same plastics material as the cylinder (37) and now comprises 21 equally sized holes uniformly distributed over the entire contact surface. The procedure and evaluation of the measurement remains unchanged compared to EP-A 640 330. The flow rate is automatically recorded.

Saline Flow Conductivity (SFC) is calculated as follows:

$$SFC\ [cm^3 s/g] = (Fg(t=0) \times L0)/(d \times A \times WP),$$

where Fg(t=0) is the flow rate of NaCl solution in g/s obtained from a linear regression analysis of the Fg(t) data of the flow rate determinations by extrapolation to t=0, L0 is the thickness of the gel layer in cm, d is the density of the NaCl solution in $g/cm^3$, A is the area of the gel layer in $cm^2$ and WP is the hydrostatic pressure on the gel layer in $dyn/cm^2$.

16 h Extractables

The level of extractable constituents in the water-absorbing polymeric particles is determined by the EDANA (European Disposables and Nonwovens Association) recommended test method No. 470.2-02 "Determination of extractable polymer content by potentiometric titration".

Moisture Content of Hydrogel

The water content of the water-absorbing polymeric particles is determined by the EDANA (European Disposables and Nonwovens Association) recommended test method No. 430.2-02 "Moisture content".

CIE Color Number (L a b)

Color measurement was carried out in accordance with the CIELAB procedure (Hunterlab, volume 8, 1996, issue 7, pages 1 to 4). In the CIELAB system, the colors are described via the coordinates L*, a* and b* of a three-dimensional system. L* indicates lightness, with L*=0 denoting black and L*=100 denoting white. The a* and b* values indicate the position of the color on the color axes red/green and yellow/blue respectively, where +a* represents red, −a* represents green, +b* represents yellow and −b* represents blue.

The color measurement complies with the three-range method of German standard specification DIN 5033-6.

The Hunter 60 value is a measure of the whiteness of surfaces and is defined as L*−3b*, i.e., the lower the value, the darker and the yellower the color is.

A Hunterlab LS 5100 calorimeter was used.

The EDANA test methods are obtainable for example at European Disposables and Nonwovens Association, Avenue Eugene Plasky 157, B-1030 Brussels, Belgium.

EXAMPLES

Example 1

1016.4 g of water were mixed with 705.1 g of caustic soda (50% by weight) in a glass beaker. 634.6 g of acrylic acid (stabilized with 200 weight ppm of hydroquinone monomethyl ether) were added dropwise with stirring and ice cooling, the temperature being maintained below 35° C. by ice cooling. To this solution were added 211.5 g of acrylic acid (stabilized with 200 weight ppm of hydroquinone monomethyl ether), in which 5.08 g of 15-tuply ethoxylated trimethylolpropane triacrylate have been dissolved. This reaction mixture was transferred into a Lödige VT 5R-MK plowshare kneader 5 l in capacity, and inertized for 20 minutes by passing nitrogen through. Finally, the kneader was started up and 2.369 g of sodium persulfate (dissolved in 13.42 g of water), 0.051 g of ascorbic acid (dissolved in 10.1 g of water) and 0.141 g of 30% by weight hydrogen peroxide (dissolved in 1.27 g of water) were rapidly added in succession to the warm solution at about 20° C. The reaction ensued speedily and, when an internal temperature of 30° C. was reached, the jacket was heated with hot heat transfer medium at 80° C. in order that the reaction may be completed under as nearly adiabatic conditions as possible. After attainment of the maximum temperature, cooling fluid (−12° C.) was then used to cool down the resultant gel to below 50° C. before it was discharged.

The gel was distributed onto two wire-bottomed metal trays and dried in a vacuum drying cabinet at 140° C. and 250 mbar. This was followed by comminution using an ultracentrifugal mill before the product was classified to a particle size from 150 to 850 μm by sieving off under- and oversize.

The base polymer thus prepared had the following properties:
CRC=31.3 g/g
AUL 0.3 psi=18.1 g/g
16 h extractables=6.8% by weight
Color numbers:
L*=85.4
a*=0.0
b*=11.4
Hunter 60=51.8

Example 2

A Lödige VT 5R-MK plowshare knead 5 l in capacity was charged with 134.9 g of water, 211.5 g of acrylic acid (stabilized with 200 weight ppm of hydroquinone monomethyl ether), 2221.1 g of a 37.3% by weight sodium acrylate solution (100 mol % neutralized) which had previously been filtered through activated carbon to remove hydroquinone monomethyl ether, and also 5.08 g of 15-tuply ethoxylated trimethylolpropane triacrylate crosslinker. The initial charge was inertized for 20 minutes by bubbling nitrogen through it. The hydroquinone monomethyl ether content, based on acrylic acid, was 50 weight ppm. The reaction mixture was cooled from the outside such that the subsequent addition of initiator took place at about 20° C. Finally, 2.369 g of sodium persulfate (dissolved in 13.42 g of water), 0.051 g of ascorbic acid (dissolved in 10.1 g of water) and 0.141 g of 30% by weight hydrogen peroxide (dissolved in 1.27 g of water) were rapidly added in succession into the kneader with stirring. The reaction ensued speedily and, when an internal temperature of 30° C. was reached, the jacket was heated with hot heat transfer medium at 80° C. in order that the reaction may be completed under as nearly adiabatic conditions as possible. After attainment of the maximum temperature, cooling fluid (−12° C.) was then used to cool down the resultant gel to below 50° C. before it was discharged.

The gel was distributed onto two wire-bottomed metal trays and dried in a vacuum drying cabinet at 140° C. and 250 mbar. This was followed by comminution using an ultracentrifugal mill before the product was classified to a particle size from 150 to 850 μm by sieving off under- and oversize.

The base polymer thus prepared had the following properties:
CRC=29.1 g/g
AUL 0.3 psi=25.7 g/g
16 h extractables=3.9% by weight
Color numbers:
L*=87.0
a*=−0.7
b*=4.2
Hunter 60=72.2

Examples 3 to 12

20 g of base polymer from Preparation Examples 1 and 2 were sprayed with a postcrosslinker solution consisting of 0.02 g of 2-oxazolidinone or diethanolamine, 0.60 g of water and 0.30 g of 1,2-propanediol by means of a syringe in a Waring laboratory mixer at medium stirring level. The moist polymer was additionally homogenized with a spatula and subsequently uniformly distributed in a Petri dish having an internal diameter of 18.5 cm and heat treated at 175° C. in a circulating air drying cabinet (Heraeus UT 12; Kendro Laboratory Products GmbH, Germany) or vacuum drying cabinet (Heraeus VACUTHERM VT 6060M; Kendro Laboratory Products GmbH, Germany) for 90 minutes. The postcrosslinked polymers were freed of lumps through an 850 μm sieve and characterized. The experimental conditions and the results are comprised in the two tables which follow.

TABLE 1

| | | | Experimental conditions | | | |
|---|---|---|---|---|---|---|
| Example | Base polymer | Postcrosslinker | Dryer | Total pressure (mbar) | Nitrogen blanket | Oxygen partial pressure |
| 3 | Example 2 | 2-Oxazolidinone | Circulating air drying cabinet | ca. 1013 | none | ca. 210 mbar |
| 4 | Example 2 | 2-Oxazolidinone | Vacuum drying cabinet | 200 | none | 42 mbar |
| 5 | Example 2 | 2-Oxazolidinone | Vacuum drying cabinet | 200 | ca. 1400 l/h | <10 mbar |
| 6 | Example 2 | 2-Oxazolidinone | Vacuum drying cabinet | ca. 1013 | ca. 1200 l/h | <10 mbar |
| 7 | Example 2 | Diethanolamine | Circulating air drying cabinet | ca. 1013 | none | ca. 210 mbar |
| 8 | Example 2 | Diethanolamine | Vacuum drying cabinet | 170 | none | 35 mbar |
| 9 | Example 2 | Diethanolamine | Vacuum drying cabinet | 220 | ca. 1400 l/h | <10 mbar |
| 10 | Example 1 | 2-Oxazolidinone | Circulating air drying cabinet | ca. 1013 | none | ca. 210 mbar |

TABLE 1-continued

| | | | | Experimental conditions | | |
|---|---|---|---|---|---|---|
| Example | Base polymer | Postcrosslinker | Dryer | Total pressure (mbar) | Nitrogen blanket | Oxygen partial pressure |
| 11 | Example 1 | 2-Oxazolidinone | Vacuum drying cabinet | 150 | none | 31 mbar |
| 12 | Example 1 | 2-Oxazolidinone | Vacuum drying cabinet | 230 mbar | ca. 1400 l/h | <10 mbar |

TABLE 2

| | | | Experimental results | | | | |
|---|---|---|---|---|---|---|---|
| Example | CRC [g/g] | AUL0.7 psi [g/g] | SFC [$10^{-7}$ cm$^3$ s/g] | L* | a* | b* | Hunter 60 |
| 3 | 25.0 | 23.1 | 133 | 86.7 | −0.7 | 9.4 | 58.5 |
| 4 | 24.3 | 22.2 | 155 | 86.8 | −1.1 | 7.0 | 65.9 |
| 5 | 23.9 | 21.4 | 166 | 86.8 | −0.9 | 4.5 | 73.5 |
| 6 | 25.2 | 23.4 | 130 | 86.9 | −0.8 | 4.5 | 73.4 |
| 7 | 24.2 | 22.9 | n.b. | 87.2 | −1.0 | 7.1 | 66.0 |
| 8 | 24.1 | 22.3 | n.b. | 87.7 | −0.9 | 4.9 | 73.0 |
| 9 | 23.6 | 21.9 | n.b. | 86.8 | −0.9 | 4.4 | 73.6 |
| 10 | 25.7 | 21.7 | 107 | 83.5 | 0.0 | 14.0 | 41.6 |
| 11 | 25.1 | 21.2 | 95 | 83.6 | −0.2 | 11.3 | 49.7 |
| 12 | 26.2 | 21.3 | 74 | 84.9 | −0.1 | 11.2 | 51.2 |

It is evident that drying under reduced pressure or under nitrogen gave distinctly whiter polymeric particles than under ambient air. Polymers prepared from but little-stabilized acrylic acid behave particularly favourably in this respect.

What is claimed is:

1. A process for postcrosslinking water-absorbing polymeric particles with at least one postcrosslinker, wherein a base polymer is prepared using an acrylic acid comprising up to 0.013% by weight of a half ether of a hydroquinone, and a total partial pressure of one or more oxidizing gases in an atmosphere overlying the water-absorbing polymeric particles is less than 140 mbar during drying and postcrosslinking.

2. The process according to claim 1 wherein the oxidizing gas is oxygen.

3. The process according to claim 1 wherein the posterosslinking is carried out at a total pressure of less than 670 mbar.

4. The process according to claim 1 wherein the posterosslinker is used together with at least one cosolvent as an aqueous solution, the boiling point of the cosolvent being not more than 160° C. or not less than 200° C.

5. The process according to claim 1 wherein the at least one posterosslinker is used as an aqueous solution in the absence of a cosolvent.

6. The process according to claim 1 wherein the at least one posterosslinker is an amide acetal, an open-chain or cyclic carbamic ester, a cyclic carbonic ester, a bisoxazoline, a polyhydric alcohol or mixtures thereof, the polyhydric alcohol having a molecular weight of less than 100 g/mol per hydroxyl group and no vicinal, geminal, secondary, or tertiary hydroxyl groups.

7. The process according claim 1 wherein the posterosslinking is carried out at a temperature in the range from 150 to 210° C.

8. The process according to claim 1 wherein the base polymer is prepared using an acrylic acid comprising not more than 70 weight ppm of a half ether of a hydroquinone.

* * * * *